Aug. 29, 1939.  C. E. PECK  2,171,372
MECHANICAL FISH-LURING DEVICE
Filed Dec. 6, 1935
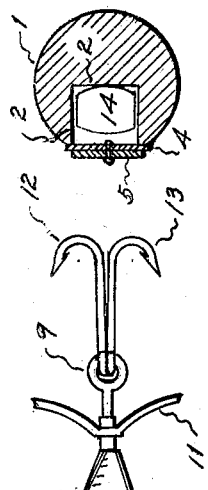
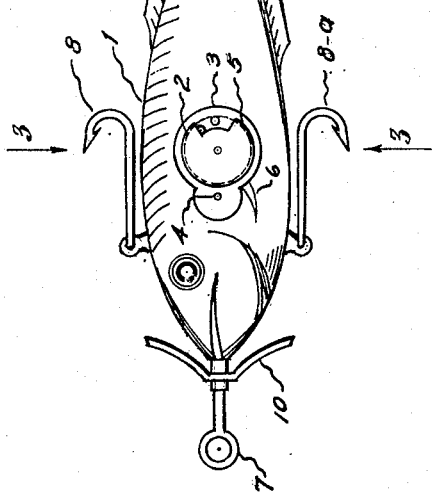
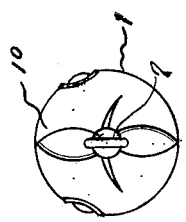
WITNESS
Merle Peck
INVENTOR
Cortz E. Peck Patented Aug. 29, 1939

2,171,372

UNITED STATES PATENT OFFICE 2,171,372

MECHANICAL FISH-LURING DEVICE

Cortez E. Peck, Beaumont, Tex.

Application December 6, 1935, Serial No. 53,205

2 Claims. (Cl. 43—46)

The invention relates to a fish luring device known as a plug. Such device is extensively used as a moving or trolling bait device by means of which fish sought after are induced to strike at the bait device and thereby become impaled upon a hook carried thereby.

The chief object of the invention is to provide an artificial bait known as a plug having an improved construction to pay out effusions which resemble the natural blood or secretions of a live injured fish.

Another object is to provide a plug that is simple and economical to make and is effective in operation.

Still another object is to provide a plug having a cover plate which is slidably moved into position to cover the bait chamber.

A further object is to provide a plug having a bait chamber cover plate that is provided with means for selectively adjusting the rate of emanation from the enclosed bait.

Other and further objects will be apparent from the following description taken in connection with the drawing in which:

Fig. 1 is a perspective showing the general arrangement of the invention.

Fig. 2 is a front elevation.

Fig. 3 is a cross-sectional view taken on the line 3—3 of Fig. 1.

The body 1 of the device is provided with a recess or chamber 2 which is designed to contain bait material, preferably in tablet form, the material being such that a color effusion will be exuded into the surrounding water. The chamber 2 is provided with a cover plate 3 which is pivotally supported by a pin 4 at a point adjacent the chamber. The cover plate is thus adapted to swing about pin 4 thus affording access to the chamber.

In order to provide for the escape of the solution from chamber 2 openings are provided in the cover plate, as is clearly shown in Fig. 1. Sector plate 5 is centrally and rotatably secured to plate 3 and may be so adjusted that the desired amount of opening from the chamber 2 is provided. A small groove 6 is also provided in the body 1 whereby water enters into the chamber 2 from the forward end thereof as the device is moved through the water.

A stem extends from the forward end of the body and is provided with a loop 7 which serves as a means for attaching a line as well as a spindle for a small blade type spinner 10 similar to a propeller. 8 and 8a are hooks of the usual and well known type and are pivotally attached to the body of the fish in the usual manner. A spindle extends rearwardly from the body and is provided with loop 9 to which is attached a plurality of hooks such as 12 and 13 and which, similar to the forward extending spindle, also pivotally supports a spinner 11.

In chamber 2, as is best shown in Fig. 3, is placed a compound 14, preferably in tablet form, which may be made of various materials in order that the effusion thrown off by it when submerged in the water may conform in color with the fluid or secretion that it is desired to imitate at the time, the purpose being to set up a strong luring tendency by providing limitation of the injured prey.

The device is inexpensive to produce and is simple and effective. Plate 3 is effectively held in position over the bait chamber 2 by the support 4 and the rate of exudation of the enclosed bait may be carefully controlled by suitably setting sector plate 5 over the holes provided in plate 3.

The invention claimed is:

1. An artificial plug for fishing comprising a body, a recess portion therein to receive scent or coloring material, a cover plate for said recess, a pivot at the forward end for said cover so that the cover may swing tangentially of the body, said pivot and cover being arranged so that the cover turns sideways of the plug body to uncover said recess, and an opening in such cover to permit escape of the scent material when it is dissolved, whereby when the lure is being drawn through the water the pressure of the water on the cover will be effective to hold the cover over the recess.

2. In a fish lure of the type having a hollow body portion and an opening into said body admitting communication with the atmosphere, a cover, means positioned substantially in a medial plane of the body for pivotally supporting the cover on the exterior portion of the body, said cover having a shutter thereon, an opening in the cover, a pivot for the shutter, said shutter pivot being in substantially the same medial plane as the pivot of the cover when the cover is in its closed position over the body opening.

CORTEZ E. PECK.